United States Patent

[11] 3,579,104

[72] Inventors Jean Pignard
Annecy;
Bernard Wintz, Cessenaz, France
[21] Appl. No. 817,968
[22] Filed Apr. 21, 1969
[45] Patented May 18, 1971
[73] Assignee International Standard Electric Corporation
New York, N.Y.

[54] DIGITAL PHASE METER WITH COMPENSATING MEANS FOR ASYMMETRIC WAVEFORM DISTORTION
6 Claims, 9 Drawing Figs.

[52] U.S. Cl. .................................................. 324/83D, 324/186
[51] Int. Cl. .......................................... G01r 25/00, G04f 9/00, G04f 11/06
[50] Field of Search............................................324/83 (D), 68 (C); 328/133, 134, 155

[56] References Cited
UNITED STATES PATENTS
3,209,254  9/1965  Hassmann ................... 324/68(C)X Primary Examiner—Alfred E. Smith
Attorneys—C. Cornell Remsen, Jr., Walter J. Baum, Paul W. Hemminger, Percy P. Lantzy and Thomas E. Kristofferson ABSTRACT: A phase-measuring instrument for waves of the same frequency is shown in basic form, in which a digital phase shift (or phase delay) reading is obtained and which may be precalibrated to read numerically in degrees or fractional parts of degrees or radians. A short, basic timing (clock) pulse is first generated every time interval $T_o$, and these are counted down also to form an enabling gate of very long duration compared to $T_o$. A coincidence circuit generates a phase delay gate equal in duration to the time between positive-going zero crossovers of two waveforms of the same frequency to be measured. This phase delay gate and the aforementioned basic timing pulses and enabling gates are supplied to the three inputs of a coincidence circuit which operate to pass said timing pulses in bursts equal in duration to said phase delay gates, only when all three of said coincidence circuit inputs are present. A counter then evaluates each of said bursts, providing said digital readout.

In more sophisticated form, the device takes an average reading between positive-going edges for half of a measurement cycle and between negative-going edges for the other half measurement cycle. Also included as refinements are circuits for avoiding erroneous reading in cases of such severe wave distortion that the positive half wave of the first wave begins before, but ends after, the positive half wave of the second wave.

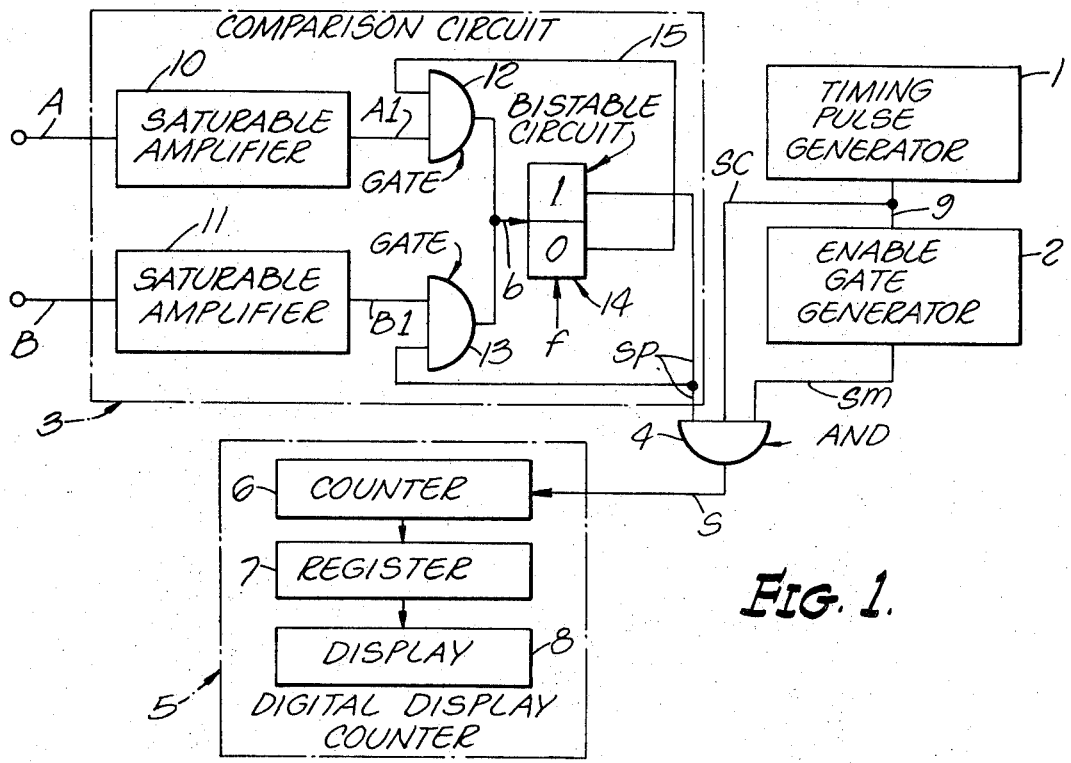
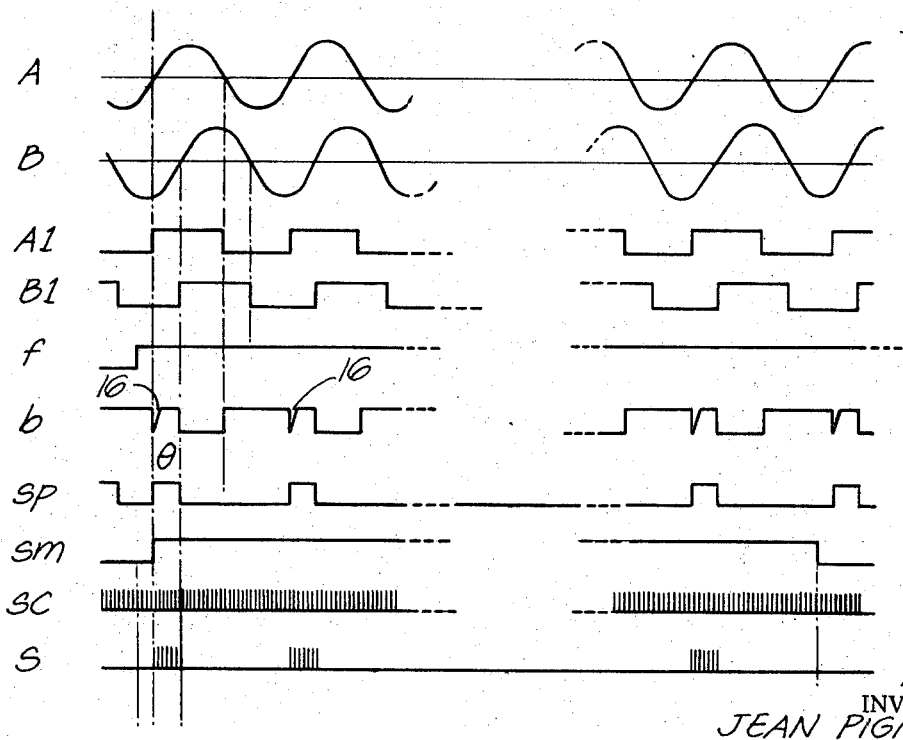

INVENTORS.
JEAN PIGNARD
BERNARD WINTZ
BY
William F. O'Neil
AGENT

DIGITAL PHASE METER WITH COMPENSATING MEANS FOR ASYMMETRIC WAVEFORM DISTORTION

CROSS-REFERENCE TO RELATED APPLICATIONS

This application is filed in accordance with the right of priority provisions of the International Convention for the Protection of Industrial Property and 35 U.S.C. 119, the herein subject matter having been originally filed in France on Mar. 15, 1968, Ser. No. PV 143,939.

BACKGROUND OF THE INVENTION

1. Field of the Invention

The invention relates to electric wave phase shift measurement for accurately determining the relative phase of two periodic waves of the same frequency.

More particularly, the present invention relates to an improved device for deriving a digital reading of phase shift, notwithstanding substantial distortion of waves to be measured.

2. Description of the Prior Art

Electronic methods of phase comparison have long been available, earliest in analog form. After establishing phase-measuring signals (at the positive-going zero crossover of each wave, for example), it was only necessary to integrate against a suitable time base for the interval between those signals to obtain an analog reading displayed on a galvanometer or similar device.

More recent trends have been toward the greater accuracy and flexibility of digital instrumentation for phase as well as frequency measurement.

The present invention presents an improved instrumentation over the straightforward prior-art devices wherein arbitrary counting points gave rise to errors in measurement whenever waves to be measured were distorted.

SUMMARY OF THE INVENTION

The present invention concerns an unique digital phase-measuring device for periodic waves of the same frequency having various novel features to be described.

In the present state of the electronic arts, digital systems and subsystems frequently offer the opportunity for instrumentation of electronic test equipment of greater accuracy and reliability than is possible using analog techniques. This is particularly true of frequency and phase-measuring equipment, the latter being the field of the present invention.

It is also to be noted that digital subsystems are usually readily incorporated into larger digital systems. This would be a particular advantage of the present invention since phase measurement is often a subsystem requirement in electronic equipment.

The present invention employs as the final component thereof, a known type of digital counter and display, for example, the type using "Nixie" tubes for the visual display. Such a counter and display is usable for frequency or other measurements and accordingly, subject to major system requirements, may be time shared with other functions.

The principle object of the present invention was the provision of phase shift measuring equipment for waves of the same frequency. The frequency bands in which the device is capable of performing have substantially no lower limit but are limited to the state of the art in respect to digital logic circuitry and components. In order to exploit the inherent accuracy of the system, digital timing (clock) pulses must have a relatively high repetition frequency compared to the frequency of the waves to be phase measured. A practical maximum usable frequency for the present invention would lie in the approximate region of 3 percent of the highest clock pulse frequency achievable, provided the accuracy requirements are not stringent.

The system of the present invention basically may be said to include structure to effect the following functional steps:

1. Squaring of positive half-cycles of input waves to obtain well-defined leading and trailing (positive-going and negative-going) waveform edges marking the respective zero crossovers of the waves to be measured.
2. Application to logic circuits to develop phase delay gates of duration equal to the time between square wave positive-going edges.
3. Gating of the clock pulse during occurrence of said phase delay gates to provide these pulses in bursts.
4. Counting of individual clock pulses in the aforementioned bursts over the period of a measuring gate (enable gate) several cycles (of input waves) in duration and presentation on a digital display.

Refinements in the structure of the invention disclosed include averaging between leading-edge time separation and trailing-edge time separation to correct for wave distortion. An additional logic circuit recognized erroneous reading due to distortion so drastic that the leading and trailing edges of a phase-shifted squared input wave do not necessarily both follow the respective leading and trailing edges of a first wave presumed to be in phase lead.

Another refinement concerns the introduction of an inhibit or "data not good" signal from the register of the digital counter associated with the display if the hundreds digit of the said register contains a reading other than "1."

Elaboration of the foregoing and other features and capabilities of the invention are contained in or will be understood from the "Detailed Description" following.

BRIEF DESCRIPTION OF THE DRAWINGS

For purposes of illustration and description, drawings are presented as follows:

FIG. 1 is a simplified block diagram of a digital phasemeter according to the invention;

FIG. 2 illustrates the wave shapes representing the signals observed at various points within the circuits of FIG. 1;

DETAILED DESCRIPTION

Figure 3:
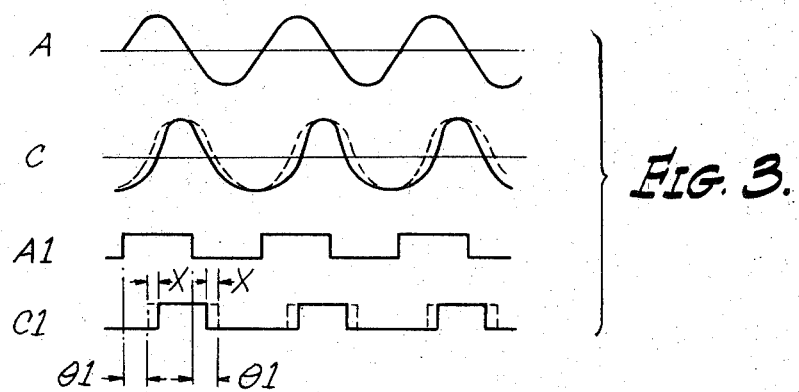
FIG. 3 depicts wave shapes explaining the effect of wave distortion on the phase measurements.

Referring now to FIG. 1, the basic components of the digital phase meter will be found.

A pulse generator 1 provides the basic (positive) timing or clock pulses $sc$ of period $T_0$. $T_0$ would normally be a very small fraction of the period of the waves to be measured, and the pulses themselves may be as short in duration as 1 microsecond or less, consistent with digital computer technology. Another pulse generator 2 is directly synchronized via its input lead 9 with pulse generator 1 and generates an enabling gate $sm$, the duration of which is $k$ times the period of the timing pulses, that is, $k\,T_0$. A comparison circuit 3 receives on its inputs A and B the two waves (the phase difference of which is to be measured) and supplies for each incoming wave period, a periodic phase delay gate $sp$. This signal $sp$ begins when one of the incoming waves passes through zero in the positive direction and ends when the other passes through zero in the same direction. The more detailed description of comparison circuit 3 to follow will point out how this is accomplished. A coincidence or AND circuit 4 receives on its three inputs which are the phase delay gate *sp*, the continuous timing pulses *sc*, and the enable gate *sm*. When these three signals coincide (i.e., are present at any one time), an output signal S is passed by AND gate 4. Finally, a digital display counter 5 receives the S signals originated from 4. This device 5 includes a counter 6 which counts the impulses delivered on signal lead S. A register 7 which records the counter position at the end of each measure and a display 8 which displays the result in digital form through means such as the well-known "Nixie" tubes, or some other visual high-speed readout.

The wave shapes of FIG. 2 illustrate an example of operation of the phasemeter according to the invention. These wave shapes represent the signals observed at various points in the phasemeter circuits. In a general way for simplification purposes, the signal to be measured and which is applied at point A will be called signal A. Similarly signal B is identified with input B of comparison circuit 3.

The operation of the phasemeter in FIG. 1 will now be described by simultaneously referring to the waveforms in FIG. 2. The generator 1 continuously provides timing pulses *sc*. The generator 2 supplies the enable gate signal *sm* asynchronously with respect to the waves A and B (the phase difference of which is to be measured). These A and B signals will be assumed for the present to be two sinusoidal waves. When the wave A passes through zero (ground) potential in the positive direction, the comparison circuit 3 begins to supply a phase delay gate *sp*. When the wave B further passes through the zero potential in the same direction, the circuit 3 stops supplying the *sp* signal. Thus, the obtained *sp* signal has a duration $\theta$ corresponding to the time shift between both waves and indicated typically on FIG. 2. This process recurs at each period of the two incoming waves.

The signals *sp* are supplied to the left input of the AND gate 4; and during each signal *sp* if the enable gate signal *sm* is supplied to the right input of the AND gate 4, the latter becomes conducting. So long as this condition is extant, timing pulses *sc*, which are supplied by the generator 1 to the middle input of AND gate 4, are delivered as on lead S. [See FIG. 2 (S line).] There will be seen to be as many such impulse trains are supplied for each enable gate as there are *sp* signals in the enable gate interval.

If the period of waves A and B is T, the total number of output impulses S (to be called X) is as follows:

$$X = k \frac{\theta}{T}$$

It will be noted that the phase difference (expressed in degrees) between these two A and B waves whose period is T and which are time shifted by $\theta$ is equal to 360 $\theta$/T. It can be seen that, if $k=360$, the number of impulses (X) directly represent the phase difference in degrees.

Similarly, the phase difference could be obtained in scales, giving $k$ an arbitrary value, such as in radians or fractions thereof. Obviously, the higher the number $k$, the more precise is the measurement. Phase could readily be measured in thousandths of a degree if $k$ is given the value 360,000.

The impulses S representing the phase shift between waves A and B are sent to the counter 6 of the display counter 5 which counts them. At the end of each measurement, the content of counter 6 is sent to register 7. The latter controls the display 8 in digital form while the counter 6 is restored to its "0" position for a new measurement. These techniques of digital counting and display are, of themselves, well known.

Concerning the details of generation of the phase delay gates *sp*, discussion of the components within, and operation of, comparison circuit 3 will be undertaken.

Within circuit 3, signals A and B will be seen to be applied to the inputs of amplifiers 10 and 11, respectively. These saturating or limiting amplifiers produce outputs A1 and B1 which are square waves as shown in FIG. 2. The said square waves have constant predetermined amplitude, and their durations are substantially the same as the positive half waves of signals A and B.

Two NAND gates 12 and 13 receive the A1 and B1 square waves respectively and operate to provide the *b* signals at their paralleled outputs. The manner in which the bistable (scale of two) circuit 14 responds to the NAND gate outputs will be described.

By way of definitional clarification, the NAND gates are said to deliver a zero output potential (ground) at low output impedance when its inputs are at a positive potential.

If at least one of the inputs is not positive, the NAND gate delivers a positive potential acting as a high-impedance source. The outputs of gates 12 and 13 are connected together; therefore, the conductor *b* will be positive if both gates deliver positive signals. On the other hand, if either of the gates delivers zero potential (at low impedance), it will mask the positive output (high impedance) of the other; and the conductor *b* will be substantially at zero or ground potential.

The bistable circuit 14 has two inputs *b* and *f* and two outputs. One output is on the side "0" which controls the conductor *a* and, in parallel, one input of the gate 12. The other output on the side "1" controls the output conductor *sp* and one input of the gate 13. When the bistable circuit 14 is in position "0," its output on the side "0" is positive whereas its output the side "1" is ground. These potentials are interchanged when the bistable circuit 14 is in position "1." If it is assumed that it is initially in position "0," a positive impulse on its input *b* triggers it into position "1." The triggering occurs at the end of the impulse on its negative or declining edge. A new positive impulse on input *b* restores it into position "0" in the same way. The input *f* serves to restore or lock the bistable circuit 14 into position "0." When *f* is at a positive potential, the bistable circuit 14 can respond to the signals received on its input *b*. This positive condition at *f* is of relatively long duration and corresponds at least to the enable gate duration *sm*.

Before a measurement, the signal (ground) applied to the input *f* holds the bistable circuit 14 in position "0." Consequently, the bistable circuit 14 delivers a positive potential on the conductor 15 towards the gate 12. At the beginning of the measurement, the signal blocking the bistable circuit 14 through its input *f* is removed by independent control means (not represented). It has been assumed for simplification purposes that the square waves A1 and B1 are equal to zero at this instant. When a positive edge of the wave A1 occurs, a positive potential is supplied to the lower input of the gate 12. The latter operates and delivers a zero potential output signal. The conductor *b* and the input of the bistable circuit 14 pass from a positive potential to a zero potential. This entails the triggering of the bistable circuit 14 into position "1."

The signal on the conductor 15 then takes a zero value, and the gate 12 becomes nonconducting and delivers a positive potential through its output causing the signal on the conductor *b* to become positive. This cycle of internal events within circuit 3 explains the shape of the *b* waveform, particularly at 16 on FIG. 2. The bistable circuit 14 also supplies a positive potential through its output "1," and the comparison circuit 3 sends a phase delay gate *sp* to the left input of the AND gate 4.

The signal *sp* is applied to the lower input of the gate 13. When a positive (rising) edge of the wave B1 occurs, the gate 13 operates and supplies a zero potential output. The signal on the conductor *b* passes from a positive potential to a zero potential and controls the trigger of the bistable circuit 14 into position "0." The latter sends a zero potential signal through its output "1," thereby interrupting the phase signal *sp*.

The gate 13 is disabled, but as the signal on the conductor 15 becomes positive, the gate 12 operates and supplies a zero potential signal on the conductor *b*. When the negative edge of the wave A1 occurs, the gate 12 disables, both gates 12 and 13 deliver positive potentials; and thus the signal on the conductor *b* becomes positive. The circuit 3 is then again in its initial state.

The above-described operation is repeated for each period of the waves A and B. Thus, the circuit 3 supplied a series of positive signals *sp* to the gate 4, which also receives the positive-counting impulses *sc* and the enable gate *sm*. The gate 4 delivers a positive output potential in the initial quiescent condition. During each signal sp in the course of a given measuring interval defined by sm, gate 4 provides a potential output S during each positive sc pulse. At the end of the measuring interval, the signal sm becomes zero and the gate 4 disables. Simultaneously, the external disable signal f may appear anew and blocks the bistable 14 in its "0" position.

From an understanding of these events, the manner of generating the sp waveform between rising edges (positive-going zero crossovers) of A and B will be understood.

Referring now to FIG. 3, the effect on phase shift measurement of distortion of one (or both) of the waves A and B will be discussed. In the example of FIG. 3, the wave A is sinusoidal while the wave C is distorted but has the same frequency. The distortion is such that it steepens the positive-going crossover and tends to flatten the negative-going zero crossover. A corresponding, undistorted sinusoidal wave is represented by a dotted line (on the C waveform line) for reference. After passing through limiting amplifiers 10 and 11, square waves A1 and C1 are obtained. The positive edges of the wave C1 will be seen to be delayed by an increment $x$. The negative edges, however, are advanced by $x$. Therefore, the phase difference $\theta 1$ cannot be measured with respect to the positive edges of the waves A1 and C1 would be lengthened by $x$ and would have a duration of $\theta+x$. If the phase difference were to be measured from the negative edges, the phase delay gate would be shorted by $x$, giving $\theta 1-x$.

In view of the foregoing, the present invention provides a solution consisting of measuring the phase difference by producing phase signals from the positive edges (duration $\theta 1+x$ during the first half of a measuring interval, and from the negative edges (duration $\theta 1-x$) during the other half of the measuring interval. The lengthening of the former, thus, will be compensated by the shortening of the latter, and the measurement will be relatively unaffected by the distortion. While there is no guarantee that a distorted wave would be advanced by $x$ on the one zero crossover and delayed by the same amount on the other zero crossover, the usual distortion encountered in wave transmission is harmonic; and, therefore, the assumption is justified under these circumstances.

Figure 4:
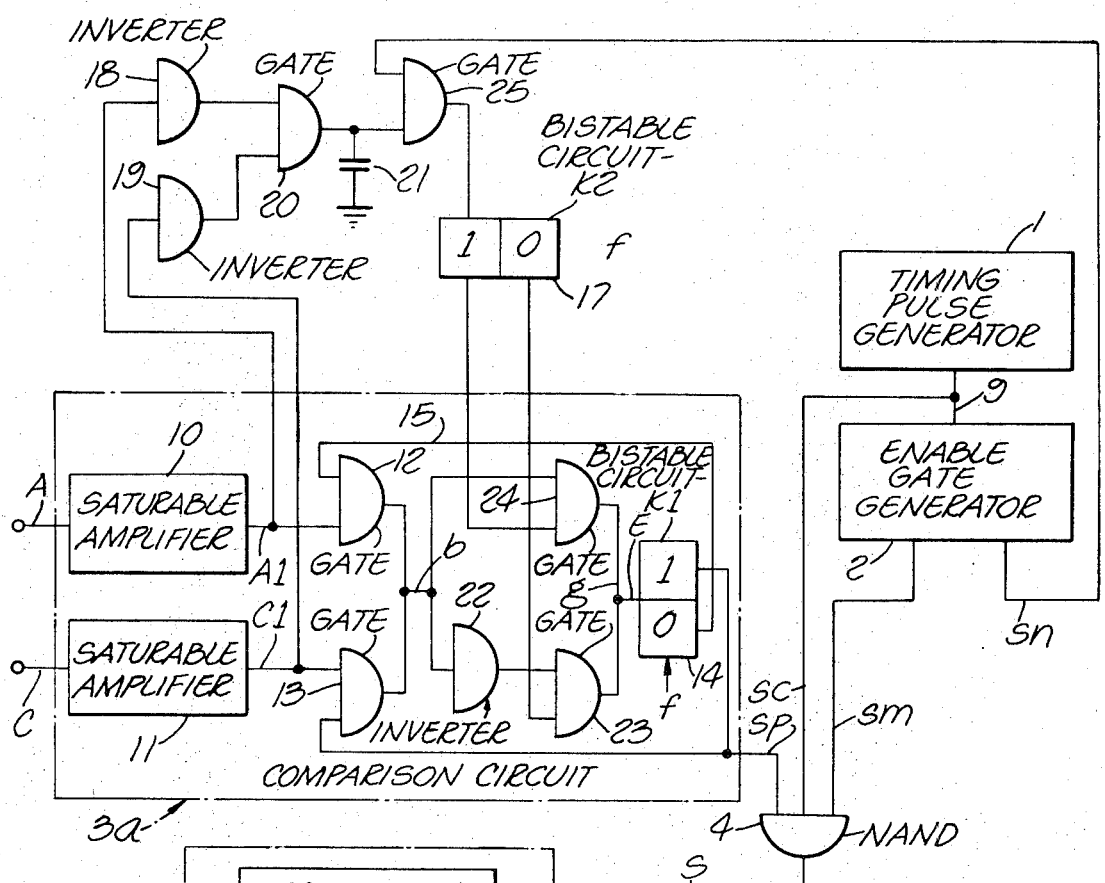
FIG. 4 shows a block diagram of an alternative of the above phasemeter in which the effects of the distortion shown in FIG. 3 are compensated.

Referring now to FIG. 4, description of the additional instrumentation required to accomplish this unique approach in accordance with the present invention, there can be found in the phasemeter of FIG. 4, all the components of that of FIG. 1, bearing the same references and having the same functions. However, the comparison circuit 3a is more sophisticated because an additional bistable circuit 17 and its control circuits (inverters 18 and 19, gates 20 and 25, and capacitor 21) have been added.

To the comparison circuit 3a, there has been added two switchable paths, between the common output of the gates 12 and 13 (conductor b) and the triggering input of the bistable 14 (conductor g). This comprises a direct transmission path including an inverter 22, a gate 23, and a reversing transmission path including only the gate 24.

The inverter 22 is a single input gate of the NAND type. When fed a zero or ground potential, it delivers a positive signal and vice versa. If the bistable 17 is in position "0," the gate 23 is conducting. This means that if the inverter 22 sends a zero potential to it, the gate 23 delivers a positive output voltage and vice versa. The direct path thus introduces two inversions which cancel out, as if the gates 12 and 13 directly controlled the bistable 14.

It is to be noted that at the same instant, the gate 24 of the inverse path, controlled by the other ("1") output of the bistable 17, is disabled. Therefore, it delivers a positive potential (at high source impedance) which has no effect upon the low-impedance signals supplied by the gate 23.

Consequently, when the bistable 17 is in position "0," the operation of the comparison circuit 3a is exactly the same as that of circuit 3 in FIG. 1, i.e., it delivers on its output sp the phase delay gating signals obtained between the positive edges of the input waves.

When the bistable 17 is in position "1," the gate 23 is disabled while the gate 24 is conducting. Thus, gate 24 passes the signals originated from the gates 12 and 13 to the input of the bistable 14 after inverting them in the process. Therefore, the bistable 14 will be seen to trigger from position "0" to position "1" when the wave A1 passes from the positive level to the zero (ground) level (negative-going edge). It is subsequently restored into position "0" by a negative-going edge of the wave C1. Consequently, when the bistable 17 is in position "1," the comparison circuit 3a delivers phase delay gate signals obtained from the negative edges of the incoming waves. It is this particular switching which is the instrument of changing from "leading" to "trailing" edge phase measurement as aforementioned.

The description may now proceed to the control circuits of the bistable 17, that is, the circuits which switch the bistable 17 into position "0" during the first half of a measuring interval in order that the phase delay gate signals be obtained from the positive edges of the incoming waves, and into position "1" during the second half of the measuring interval, in order that the phase delay gate signals be obtained from the negative edges of the incoming waves.

To this end, the generator 2 also supplies a positive signal sn beginning at the middle of each measuring interval and continuing to the end of sm, as an additional separate output. This signal sn is sent to one input of the gate 25 and tends to render it conducting.

The other input of the gate 25 is controlled by a circuit which includes the inverters 18 and 19, the gate 20, and the capacitor 21. If the positive A1 wave is present, the inverter 18 feeds a zero potential to the gate 20, which renders it nonconducting. The latter then delivers a positive potential which charges the capacitor 21 and renders the gate 25 conducting. If the wave C1 is present (positive), the gate 25 is equally well enabled by the inverter 19 and the gate 20.

Thus, it will be seen that if either of the waves A1 or C1 (or both) is positive, the gate 25 operates as soon as the generator 2 supplies the signal sn. Gate 25 also controls triggering of the bistable 17 in position "1" in the middle of the measuring interval, which then switches the bistable control circuit 14 from the direct path onto the inverse path as previously explained.

At any time when both input waves are equal to zero, this switching does not occur immediately. As soon as one wave becomes positive, the gate 20 is disabled, causing the capacitor 21 to be charged. During the capacitor charging time, the comparison circuit operates in response to a positive edge just appearing (triggering bistable 14) and stabilizes. When the capacitor 21 is charged to a predetermined potential, the gate 25 operates and triggers the bistable 17 into position "1"; and at that time, the aforementioned switching takes place.

Therefore, the object of the above-mentioned circuit (inverters 18 and 19, gate 20, and the capacitor 21) is to delay the switching from the direct path onto the inverse path, as long as the waves A1 and C1 equal zero. A careful analysis of the comparison circuit operation conditions reveals that otherwise a transitory anomaly in the phase delay gate generation would occur, but is avoided by addition of the above-described additional logic circuitry.

Figure 5:
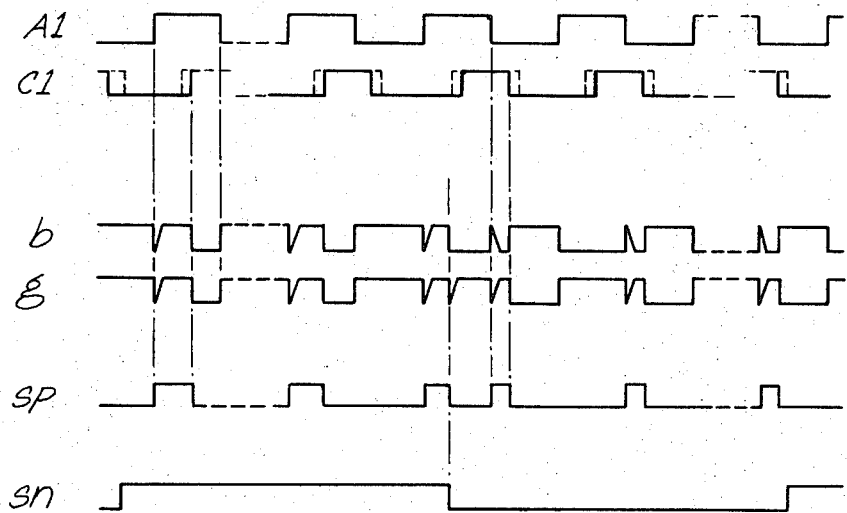
FIG. 5 illustrates the wave shapes representing the signals observed at various points in the circuits of FIG. 4.

A review of the operation of FIG. 4 with reference to the wave shapes of FIG. 5 will help to understand the variation of the sp signal duration and the difference in the b waveform between halves of the measuring cycle as marked by the illustrated bistable 17 cycle. At the outset of a measuring interval, the signal f is cancelled as aforementioned; and the signal sm is extant. The square waves A1 and C1 obtained from the waves A and C equal zero, and bistables 14 and 17 are in position "0."

The gate 24 is nonconducting while the gate 23 is conducting. As above-mentioned, the "direct path" is open; and signals from the conductor b pass to the conductor g. The comparison circuit operation is identical at this time to that of FIG. 1, in that it delivers sp signals generated from the positive edges of the waves A1 and C1 as amply described hereinbefore. It will be noted accordingly that *b* and *g* waveforms on FIG. 5 are identical for this first half measuring cycle.

After half of the measuring interval has elapsed, the generator 2, through its signal *sn* triggers the bistable 17 into position "1." The gate 24 is rendered conducting, while the gate 23 is blocked. The inverse path is thus opened instead of the direct one, and the signals from the conductor *b* are passed after inverting conductor *g*.

It has been assumed that the triggering of the bistable 17 occurred while the wave A1 was positive, and the bistable 14 in position "1" received a positive potential on the conductor *g*. The changing of the path reverses the latter signal, causing it to become equal to zero and thereby to trigger the bistable 14 into position "0." Consequently, the gate 23 operates and delivers a ground output potential. Similarly, gate 24 provides a positive potential on the conductor *g*. The bistable 14 then remains in position "0."

Later on, at the arrival of a negative-going edge of the wave A1, the gate 12 will deliver a positive potential and the gate 24 to a zero potential, triggering bistable 14 into position "1" (beginning of the first phase delay gate signal *sp* since the switching operation). At the time of the next negative edge of the wave C1, the gate 13 will deliver a positive potential, which causes bistable 14 to trigger into position "0" (end of the phase signal *sp*). The introduction of an inverse path between the conductors *b* and *g* thus enables the phase delay gate signal generation from the negative edges of the waves to be measured instead of obtaining them from the positive edges. It will be noted that the illustrated *sp* signals in FIG. 5 are correspondingly shorter in duration than those of the first half measuring cycle.

Various other operation examples may be contemplated when the signal *sn* appears (switches) depending upon the incoming waves and position of bistable 14. All result in the replacement of the phase delay gate signal generation from the positive-going edges of the incoming waves to the negative-going edges of the same waves.

It is to be noted that in the ultimate, the circuit of FIG. 4 does not suffice by itself in all possible combinations of input waves for the phase measurement. Indeed, when the distortion advances the negative-going edges of the wave C1 more than the actual phase difference to be measured delays, then the phase signals *sp* generated from these negative edges are erroneous, as it will appear by referring to FIG. 6.

Figure 6:
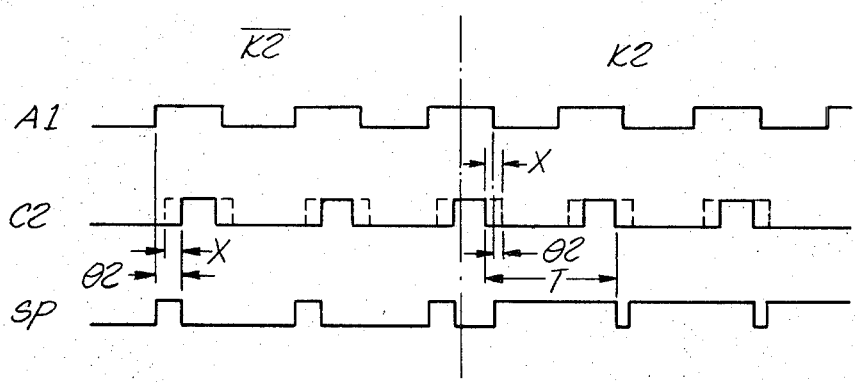
FIG. 6 illustrates the wave shapes in a mode of operation of the device of FIG. 4 resulting from exaggerated distortion of the second of the waves to be compared in phase.

FIG. 6 represents the wave A1, which is the same as in the aforementioned examples of operation, and a wave C2 having the same shape as the wave C1 of FIG. 3, but slightly delayed by O2 with respect to A1. The distortion always advances the negative edges by the duration *sc*; but it can be seen that $\theta 2$ is shorter than *x*; and a negative-going edge of C2 occurs before the corresponding negative edge of A1, whereas it should occur later as is the case for the positive edges. FIG. 6 also represents the signals *sp* generated, in this case, by the circuits of FIG. 4 during the first half of the measuring interval ($\overline{K2}$) and during the second half (K2).

The signals *sp* are normally and correctly obtained from the positive edges during the first half of the measuring interval; however, the signals *sp* further generated from the negative edges are erroneous as already indicated. Whereas they should have a duration equal to $\theta 2-x$, their actual length is T+$\theta 2$—. There in arises an error of T (a period of the waves to be measured) during this half of the measuring interval, resulting in a net display error of T/2 or 180°.

What has just been described also applies to the situation when the distortion direction is reversed and a negative-going edge of the wave C1, which normally should preceded the corresponding negative-going edge of the wave A1, occurs after it due to the distortion.

The present invention thus also concerns an error detection circuit allowing the detection of such an error and providing for its correction. The circuit providing this additional function is illustrated in FIG. 7, and its operation will be described by means of the wave shapes of FIGS. 8 and 9.

Figure 7:
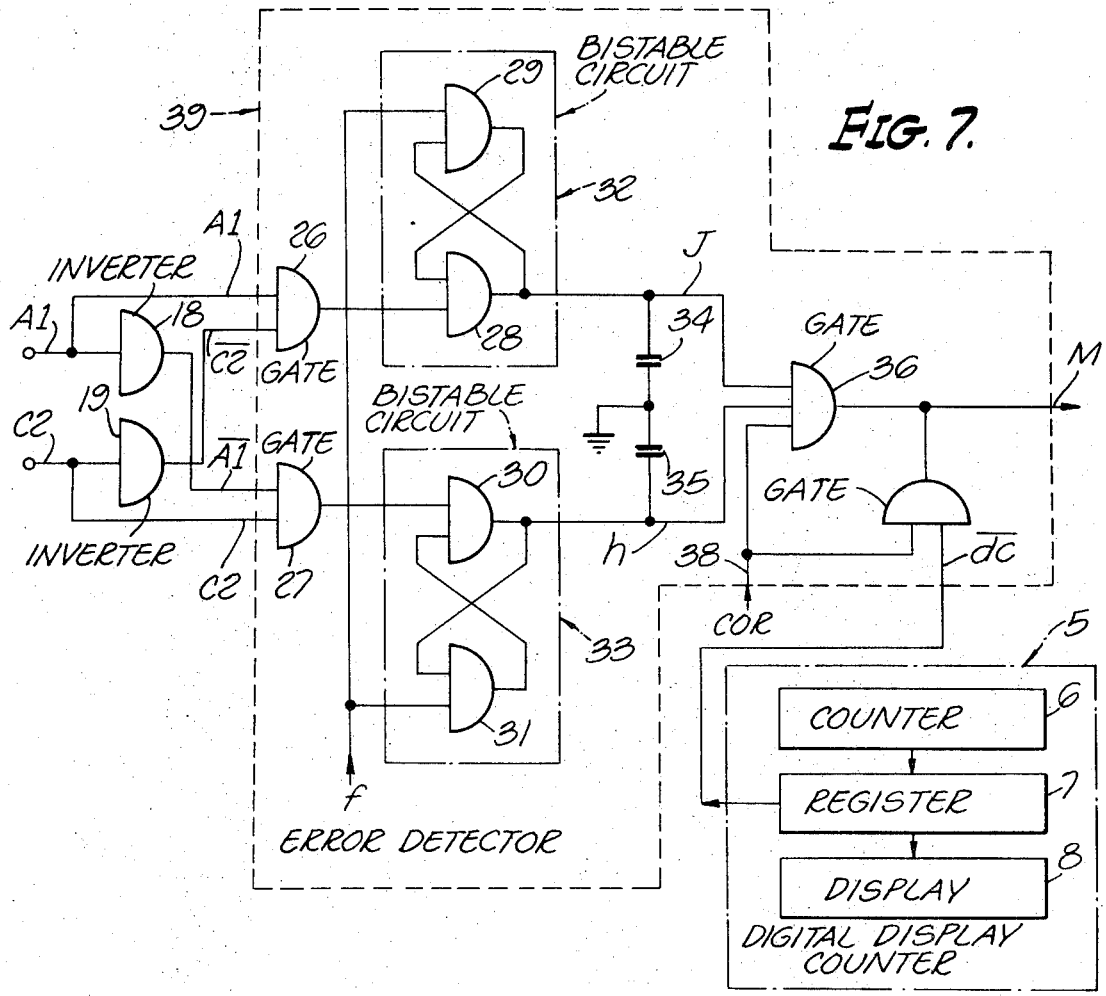
FIG. 7 shows an additional circuit for use with the circuits of FIG. 4 to prevent erroneous reading under exaggerated distortion conditions.

The additional circuitry includes an error detection device which is illustrated in FIG. 7 and mainly comprises two input gates 26 and 27, two bistables 32 and 33, an output gate 36, and two capacitors 34 and 35 within 39, the error detector. A dotted line encloses the newly added circuitry 39, separating it from the existing circuits from FIG. 4. The inverters 18 and 19 are shown for reference on FIG. 7. Thus, it will be seen that the inputs of the FIG. 7 device are A1, C2, $\overline{A1}$, and $\overline{C1}$, as well as other control functions to be described.

The gate 26 (of the NAND type) is controlled by the wave A1 and by the inverted wave C2, from the inverter 19 and referred to as $\overline{C2}$. If at any moment of the measurement, the wave A1 is positive while the wave C2 equals zero, the gate 26 operates and delivers a zero or ground potential towards the bistable 32.

The bistable 32 consists of two gates (of the NAND type) 28 and 29. Before any measurement, the aforementioned signal *f* equals zero and disables the gate 29, the latter delivering a positive potential to the gate 28. If the gate 26 is also nonconducting and therefore delivers a positive output potential, the gate 28 operates and sends a zero (ground) which disables the gate 29. The bistable constituted by the gates 28 and 29 is then said to be in position "0." At the beginning of a measurement, the signal *f* becomes positive. Whenever the gate 26 delivers a zero signal, the gate 28 becomes nonconducting and delivers a positive potential. In response, the gate 29 operates and delivers a zero (ground) which disables the gate 28, even if the output of the gate 26 becomes positive anew. The bistable will have triggered to position "1" and will remain in this state until the signal *f* restores it to position "0." Thus, it records the coincidence A1/$\overline{C2}$.

The gate 27 is similarly controlled by the wave C2 and by the inverted wave A1 supplied by the inverter 18 and referred to as $\overline{A1}$. This gate controls a bistable 33 consisting of gates 30 and 31. These three gates as their arrangement and operation are identical to those above described (gates 26, 28, and 29). The bistable 33 thus records the coincidence $\overline{A1}$/C2.

The gate 36 is a NAND-type gate controlled by the bistables 32 and 33 and by a signal on lead 38 delivered after the end of a measurement.

Figure 8:
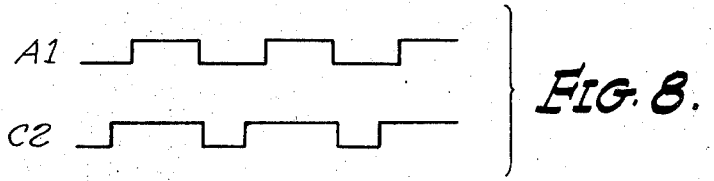
FIG. 8 wave shapes show a second example of operation of the circuit of FIG. 7.
Figure 9:
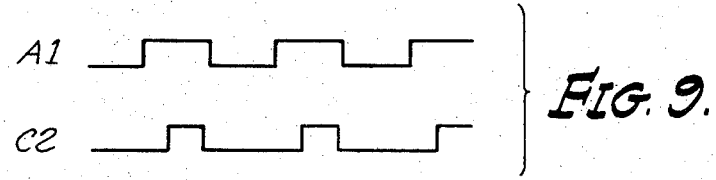
FIG. 9 wave shapes show a second example of operation of the circuit of FIG. 7.

Before describing the functions of the other FIG. 7 components in detail, the overall operation of the error detection circuit of FIG. 7 will be related to FIGS. 8 and 9.

The wave shapes of FIG. 8 illustrate the case when the distortion lengthens the positive alternations of the wave C2 so much that a negative edge of this wave (which should normally be fore the corresponding negative edge of the wave A1 in the same manner as for the corresponding positive edge) is delayed so that it actually appears later rather than before. It can be seen immediately that, in this case, when the wave A1 is positive, the wave C2 is also positive. Consequently, the A1 and $\overline{C2}$ conditions never obtain; and accordingly, the bistable 32 remains in position "0" and delivers a ground potential on the conductor *j*, thus blocking the gate 36.

The wave shapes of FIG. 9 illustrate the case when the distortion shortens the positive alternations of the wave C2 so that a negative edge of this wave, which should normally occur after the corresponding negative edge of the wave A1 (as is the case for the positive edge), is advanced so that it appears earlier. It can be seen immediately that, in this case, when the wave C2 is positive, the wave A1 is also positive; and consequently, the $\overline{A1}$/C2 conditions never obtain. Therefore, the gate 27 does not operate, and the bistable 33 remains in position "0" and delivers a ground potential on the conductor *h*, thus disabling the gate 36.

It will not be noted that in both cases when the distortion causes a shift of the negative edge of the wave C2 leading to a measurement error, the gate 36 remains disabled. After the end of the measurement, the signal *cor* on lead 38 has no effect. The gate 36 sends a positive signal through its output wire M, which indicates that the measurement carried out is shifted by a half period. This signal can be used to light a lamp which calls attention to the display error, or to automatically correct the display by, for example, modifying the content of the counter 6 by subtracting 180°. The signal on lead 38 may be thought of as a "data good" inquiry control which may be manually operated or automatically supplied at the end of a measurement cycle. It is a necessary but not sufficient signal to operate gate 36 to obtain a signal on output M if otherwise warranted.

In all other cases, the two bistables 32 and 33 both operate and deliver positive signals towards the gate 36. At the end of the measurement, when the signal on lead 38 is supplied, the gate 36 operates and delivers a ground potential through its output wire M which indicates that the measure is correct.

The capacitors 34 and 35 operate to cause a measurement to be considered as erroneous and a corresponding false reading indication given when the duration of the coincidences A1/$\overline{C2}$ or $\overline{A1}$/C2 is short, that is, when the positive or negative edges of the two waves to be measured are close to one another. It is difficult to predict signal propagation times and circuit operation times with sufficient accuracy and repeatability. Consequently, it is necessary to consider the case when the negative edges of both waves are very close in time as indeterminate. Irrespective of the real order of these close edges, the phase meter operates as if it were in the A1/C2 order (coincidence $\overline{A1/C2}$). The manner of effecting the lock for this purpose concerns the capacitors 34 and 35.

The capacitor 34 is connected between ground and the output of the gate 28. When the bistable 32 is position "0," this capacitor is not charged. If the A1/$\overline{C2}$ conditions are met, the gate 26 operates and disables the gate 28. The latter tends to deliver a positive signal and to trigger the bistable; however, this positive signal must first charge the capacitor 34 before the gate 29 may operate and the bistable 32 trigger to the "1" position. If the duration of the coincidence A1/$\overline{C2}$ is short, the capacitor 34 will not have had time to be sufficiently charged. While the gate 26 disables, the gate 28 operates anew, since the gate 29 has not operated, and the bistable 32 remains in position "0." Thus, the capacitor 34 enables the bistable 32 not to respond to the coincidences A1/$\overline{C2}$, when they are short. The capacitor 35 has the same function with respect to the coincidence $\overline{A1}$/C2 and the corresponding bistable, etc.

This gate 37, as illustrated in FIG. 7, is controlled by the signal *cor* at the end of the measurement and by a signal *dc* originated from the register 7 of the display device 5. The signal *dc* is supplied by the register 7 when the hundreds digit of the indication to be displayed in degrees is different from 1. The gate 37 always operates at the end of the measurement when the hundreds digit of the number to be displayed is different from 1. It delivers a ground potential at low impedance which swamps any positive potential supplied by the gate 36, thereby effecting disregard of the error detection output M.

Inhibition of this correction error indicator signal is desirable since it is not significant when the measurable phase difference is far from the areas of possible ambiguity above discussed.

It will be noted that the device of the present invention is readily instrumented with solid-state components and techniques, however, its scope is not limited to the specific details of circuitry.

We claim:
1. A digital phase meter for measuring phase difference between first and second periodic input waves of the same frequency, comprising:
   comparison means responsive to said first and second input waves for generating a phase delay gate for each cycle of said waves, equal in duration to the difference in time between a predetermined point on said first wave and a corresponding point on said second wave;
   means for generating a continuous series of timing pulses of repetition frequency large compared to the frequency of said waves to be measured;
   an enabling gate generator interconnected with said means for generating timing pulses for producing enable gating pulses relatively long in duration and equal to a predetermined integral number of pulse repetition intervals of said timing pulses, and further equal in duration to at least one cycle of said first and second waves;
   pulse control responsive to said timing pulses, said enable gate pulses and said phase delay gates for passing said timing pulses in burst during such time as said timing pulses, enable gate pulses, and phase delay gates are all extant at said pulses control means; and
   digital counting means for counting pulses within said bursts during each enable gate, thereby to provide a digital number indicative of the phase shift of said second input wave with respect to said first input wave.

2. The invention set forth in claim 1, wherein said predetermined points on said first and second input waves are defined as their positive-going zero crossover points.

3. The invention set forth in claim 2, further defined in that said enable gate generator includes means to generate a switching signal which is in a first switching condition substantially during the first half of said enable gating pulses and which is in a second switching condition substantially during the second half of said enable gating pulses, and said comparison circuit includes means responsive to said switching signals for enabling the generation of said phase delay gates from said first and second input wave positive-going zero crossover points during said first switching condition, and between their respective negative-going zero crossover points during said second switching condition.

4. The invention set forth in claim 3 further defined in that said comparison means includes means for converting said first and second input waves into corresponding first and second auxiliary waves of standarized amplitude and duration, each equal to the positive half cycle of the corresponding input wave.

5. The invention se forth in claim 3 further defined in that said comparison means also includes an error detection circuit for providing an indication of erroneous reading comprising logic circuit means for determining whether or not the first occurring positive-going edge, and if not to disable the output of said comparison means.

6. The invention set forth in claim 5 further defined in that said digital counting means includes means for generating a disabling signal when the register of said counting means registers other than 1 in its hundreds digit, and further means are included for applying said register disabling signal to the output of said error detector.